United States Patent [19]

Krijger et al.

[11] Patent Number: 5,236,781
[45] Date of Patent: Aug. 17, 1993

[54] PLASTIC GRANULATE CONTAINING NON-DISPERSED REINFORCING FIBRE BUNDLES

[75] Inventors: Louis C. Krijger, Geleen; Jozef M. A. Jansen, Sittard; Caroline H. Ipenburg, Born, all of Netherlands

[73] Assignee: Stamicarbon B.V., Geleen, Netherlands

[21] Appl. No.: 648,643

[22] Filed: Jan. 31, 1991

[30] Foreign Application Priority Data

Jan. 31, 1990 [NL] Netherlands .................. 9000235

[51] Int. Cl.$^5$ .................................. B32B 5/16
[52] U.S. Cl. .................................. 428/402; 428/288; 428/292; 428/303; 428/311.5; 428/339; 428/364
[58] Field of Search ............ 428/288, 293, 303, 311.5, 428/312.6, 317.9, 339, 402, 292, 364, 397; 427/370, 388.5, 389.8; 162/164.1, 116

[56] References Cited

U.S. PATENT DOCUMENTS

| | | | |
|---|---|---|---|
| 3,684,645 | 3/1969 | Temple et al. | 428/293 |
| 4,037,011 | 7/1977 | Hattori et al. | 428/294 |
| 4,250,221 | 2/1981 | Pfeffer | 428/284 |
| 4,431,696 | 2/1984 | Di Drusco et al. | 428/212 |
| 4,559,262 | 12/1985 | Cogswell et al. | 428/294 |
| 4,944,965 | 7/1990 | Luxon et al. | 427/389.7 |
| 5,019,450 | 5/1991 | Cogswell et al. | 428/402 |

Primary Examiner—Paul J. Thibodeau
Assistant Examiner—Hoa T. Le
Attorney, Agent, or Firm—Cushman, Darby & Cushman

[57] ABSTRACT

The present invention relates to a granulated thermoplastic polymer composition comprising granules incorporating 0.1–50% (vol) fiber bundles. The fiber bundles have a three dimensional orientation in each of the granules, and each fiber bundle contains at least 100 fibers. The present invention also relates to a process for producing a granulated thermoplastic polymer composition containing non-dispersed fiber bundles comprising the steps of mixing a thermoplastic polymer with fiber bundles at a sheer stress low enough to prevent the fiber bundles from falling apart, and the forming granules. A temperature of a dosage point where the fiber bundles are added to the thermoplastic polymer is below a processing temperature of the thermoplastic polymer. Each granule comprises 0.1 to 50% (vol) of the fiber bundles. The fiber bundles have a three dimensional orientation in each granule, and each fiber bundle contains at least 100 fibers.

6 Claims, 2 Drawing Sheets

PLASTIC GRANULATE CONTAINING NON-DISPERSED REINFORCING FIBRE BUNDLES

BACKGROUND OF THE INVENTION

Field of the Invention

The invention relates to a plastic granulate containing non-dispersed reinforcing fiber bundles.

DESCRIPTION OF THE RELATED ART

Such a plastic granulate is known from U.S. Pat. No. 4,169,186. In this application a plastic granulate is described in which non-dispersed glass fiber bundles are present. The glass fiber bundles in the granulate are all of them oriented parallel to the longitudinal axis of the granulate. Round the glass fiber bundle an extra coating of oriented material has been applied to improve the compatibility with the plastic with which the glass fiber bundles are mixed.

The glass fiber bundles are put in the extruder by means of a long strand, with the plastic melting all around, at a temperature which at least equals the processing temperature of the plastic. The strand of glass fiber bundles and plastic is subsequently pulled from the extruder via pultrusion, cooled and granulated. In order to be able to apply this production technique, the plastic must have a low melt viscosity.

A disadvantage of such a granulate is that the glass fiber in a bundle must also be coated itself to allow it to be dispersed properly in its incorporation in an end-product. Another disadvantage is the strict parallel orientation in respect of the longitudinal axis of the granulate, which requires a complex technique for the production of the plastic granulate.

SUMMARY OF THE INVENTION

The object of the invention is to provide a plastic granulate, and a process for this purpose, that does not have said disadvantages.

The present invention relates to a granulated thermoplastic polymer composition comprising granules incorporating 0.1–50% (vol) fiber bundles. The fiber bundles have a three dimensional orientation in each of the granules, and each fiber bundle contains at least 100 fibers.

In another embodiment of the invention, the granules have a degree of dispersion of 0.01–0.10. The degree of dispersion being the reciprocal value of the average volume fraction occupied by the fiber bundles and average volume fraction expressed as a percentage of a granule, measured via the threshold value method.

Another embodiment of the invention comprises a process for producing a granulated thermoplastic polymer composition containing non-dispersed fiber bundles comprising the steps of mixing a thermal plastic polymer with fiber bundles at a sheer stress low enough to prevent the fiber bundles from fall apart and the forming granules. The temperature at a dosage point where the fiber bundles are added to the thermoplastic polymer is below a processing temperature of the thermoplastic polymer. Each granule comprises 0.1 to 50% (vol) of the fiber bundles. Each fiber bundle contains at least 100 fibers and the fiber bundles have a three dimensional orientation in each granule.

DESCRIPTION OF THE PREFERRED EMBODIMENTS

Figure 1A:
FIG. 1A is a picture of a plate according to example IX.
Figure 1B:
FIG. 1B is a picture of a plate according to example IX with a threshold value set at 150.
Figure 2A:
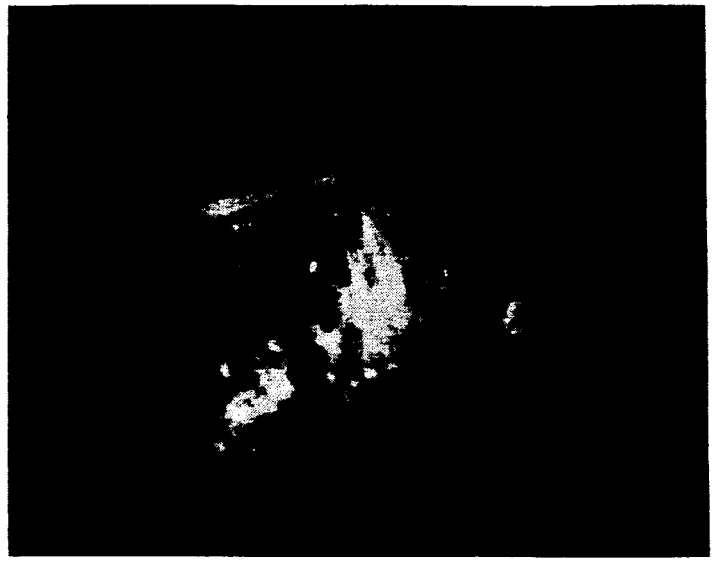
FIG. 2A shows a picture of a plate according to a comparative experiment B.
Figure 2B:
FIG. 2B is a picture of a plate according to a comparative experiment B wit a threshold value set at 150.

The plastic granulate according to the invention is characterized in that the granulate consists of granules incorporating 0.1–50% (vol) fiber bundles, with random three-dimensional orientation of the fiber bundles in a granule. The glass fiber bundles preferably have an amount of glass fibers of at least 100 fibers to the bundle. Preferably 200–5000, more specifically 400–1000. A random three-dimensional orientation of fiber bundles in a granule provides granules with fiber bundles substantially not parallel to the longitudinal axis of the granule.

It has been found that with the plastic granulate according to the invention end products are obtained in which the fibers are very well dispersed. Thus good properties are obtained, both in the longitudinal processing direction and perpendicular thereto. Owing to their presence in the granulate, the fiber bundles will fall apart comparatively late in the processing, for instance in injection moulding, the breaking of the fibers being substantially avoided. In order to achieve this avoiding of the breaking of the fibers, an extra coating round the fibers is not necessary.

The plastic granulate according to the invention is further characterized in that the granulate has a maximum degree of dispersion of 0.10. In case the degree of dispersion exceeds 0.10, the degree of dispersion is considered to be very poor. Preferably, the degree of dispersion is 0.04 at most, more specifically 0.02 at most.

The degree of dispersion is defined as the reciprocal value of the volume fraction $(V_v)$ occupied by fiber bundles in a granule. This volume fraction (V) is expressed as a percentage of a granule, measured via the threshold value method. Since the volume fraction occupied by fiber bundles, measured via the threshold value method, is 100% at most, the minimal degree of dispersion is 0.01. The threshold value method consists in the determination of $V_v$ by means of digital picture processing and picture analysis. In order to obtain a reliable indication of $V_v$, the granules are moulded to form a plate.

By means of digital picture processing, a picture of a moulded plate is converted into a matrix with a great many dots, using a video camera and a digital converter. Often a picture is converted into a (256×256) matrix of dots. Every dot is given a discrete value corresponding with the intensity of light in the starting picture; for instance, black will be 0, white will be 255, and intermediate intensities are divided pro rata. The principle of this method is described in A. Rosenfeld, A. C. Kak, 'Digital Picture Processing', vols 1 (chapter 4) and 2 (chapter 10) (1982).

By choosing a threshold value in the discretized intensities, it is possible to distinguish between the fiber bundles and the plastic matrix and to measure the surface fraction $(A_A)$ occupied by the fiber bundles in the cross section. Often the chosen threshold value is in between 50 and 200, more specifically in between 80 and 160.

The chosen threshold value is determined by the amount of fibers present per mm$^2$ of surface. This threshold value must be such that the surface occupied by fibers is at least 5% of the total surface. Preferably at least 10%.

The number of fibers may range in this connection from 100–25000 fibers per mm$^2$ cross section, with a fiber diameter of 2–24 μm. If the amount of fibers per mm$^2$ cross section is lower than 100, the difference in light intensity between the starting picture and areas in which no or hardly any fibers are present will be too small to make a proper distinction.

By means of geometric/statistic observations it is possible to conclude that, irrespective of the form or size of the structures the surface fraction ($A_A$) is the same on average as the volume fraction ($V_v$) sought. This is described in E. R. Weibel, 'Stereological Methods', vol. 2, chapter 3, 1980.

Owing to the low degree of dispersion of the fibers in the plastic, the fracturing of the fibers is suppressed, whereas the falling apart of the fiber bundles during the preparation of the end product is of an excellent standard.

In the plastic granulate according to the invention any reinforcing fiber can be used as long as the fiber is available in a fiber bundle. Examples of such fibers are carbon fibers, aramide fibers, wollastonite fibers and glass fibers. The invention is particularly suited for the use of glass fibers as reinforcing material in plastic.

The glass fiber bundle used may be any commercially available glass fiber bundle. The plastic granulate according to the invention, however, is particularly suited if glass fibers are used having a length of between 2–15 mm. More particularly 4.5–10 mm. The glass fiber bundles may be provided with an extra coating to improve the adhesion to the plastic to be mixed with it, but this is not strictly necessary.

Generally, the plastic in the granulate according to the invention is a thermoplastic polymer composition. It includes polyolefins, particularly homopolymers and copolymers of propylene and ethylene; copolymers, particularly styrene acrylonitrile and styrene maleic anhydride copolymers; nylon; polyphenylene oxides; polyphenylene oxide polystyrene mixtures; polyphenylene sulphides; polyacetals; polysulphones; polycarbonates; polyurethanes; cellulose esters; amorphous and/or crystalline polyesters, for instance polyethylene terephthalate, polyoxybenzoyl polyesters; polymonochlorostyrene; acryl polymers; polyvinyl chlorides; polyvinylidene chlorides; copolymers of vinyl chloride and vinylidene chloride; various elastomers, for instance (graft)copolymers based on styrene and butadiene or ethylene and propylene and mixtures of said plastics.

The invention also comprises the process by which the plastic granulate according to the invention is obtained. The process is characterized in that the fiber bundles and the plastic are mixed with each other at a relatively low shearing stress, the temperature at the place where the fiber bundles are dosed to the mixing device being below the processing temperature of the plastic. The processing temperature is dependent on the plastic that is used, and is obvious for a person skilled in the art. Thus a granule is obtained with a degree of dispersion lower than 0.10 in which fiber bundles do not fall apart, but are ultimately to be found showing random orientation.

In the application of the pultrusion production technique as described in U.S. Pat. No. 4,169,186 and EP-A-170245 the melt viscosity of the plastic used is an important parameter. It has been found that in the process according to the invention this parameter is not so important.

In the patent specification EP-A-170245 plastic granulates are described obtained from pultruded plastic-coated glass fiber strands. Example 4 of EP-A-170245 describes a glass-filled polypropylene granulate in the preparation of which it is necessary to substantially reduce the melt viscosity of the polypropylene to be used before it can be processed. The process according to the invention does not have this disadvantage.

Unlike the process according to the invention, pultrusion processes are very expensive techniques, which may inhibit their commercialization.

The mixing device used is preferably a single or contra-rotating twin-screw extruder, optionally provided with a progressive core screw.

More particularly a single-screw extruder with a progressive core screw. The screw design contributes to achieving a low shear stress. The person skilled in the art will be aware of this and will know what screw designs will qualify.

Moulding compounds wholly or partly produced from the plastic granulate according to the invention have excellent properties both in the processing direction and perpendicular thereto. This makes the plastic granulate according to the invention perfectly suited for being converted into fiber-reinforced end-products.

The moulding compounds can be obtained from the granules according to the invention using the known processing techniques, for instance injection moulding. In injection moulding, the bundles will fall apart into fibers that will disperse in the plastic matrix. As in the production of the granules hardly any fracturing of the fiber bundles has taken place good properties are obtained in a final moulding compound.

To the plastic granulate according to the invention the usual additives can be added, for instance stabilizers, pigments, lubricants and organic and/or inorganic fillers.

The invention is elucidated by means of the following examples without being limited thereto.

EXAMPLES I UP TO AND INCLUDING VII

In a Schwabenthan single-screw extruder (45 mm, 30 D), compositions were extruded of polypropylene, having a melt index of 3.5 or 18 (being Stamylan P, PHC 22 resp. Stamylan P, 19 MN 10), together with glass fiber bundles. The glass fiber bundles were dosed to the devolatilizing opening of the extruder (15 D, d=45 mm) in amounts of 30% (wt) (=12% (vol)) calculated on the polypropylene.

The glass fiber bundles (Silenka 8045 and 8394) are 4.5 mm long and have about 600 fibers in one bundle.

The following temperatures and speeds were set (table 1).

TABLE 1

| Ex. | Stamylan PHC 22 (kg/h) | Stamylan 19 MN 10 (kg/h) | Silenka 8045 (kg/h) | Silenka 8394 (kg/h) | Temperature T1 T2 T3 T4 T5 (°C.) | Speed (rpm) |
| --- | --- | --- | --- | --- | --- | --- |
| I | 10 | | | 4.3 | 50-120-200-230-220 | 75 |
| II | 10 | | | 4.3 | 180-200-200-220-220 | 50 |
| III | | 10 | | 4.3 | 50-120-200-230-220 | 75 |
| IV | | 10 | 4.3 | | 170-200-210-220-220 | 75 |
| V | | 10 | | 4.3 | 170-200-210-220-210 | 75 |
| VI | 4.5 | | 1.94 | | 50-100-190-220-210 | 75 |
| VII | 4.5 | | 1.94 | | 170-200-200-210-210 | 75 |

The temperatures mentioned in table 1 refer to several zones in the extruder. T1 is the inlet temperature, T2 the temperature just before the devolatilizing opening. After this opening there are two temperature zones, having temperatures T3 and T4; the temperature at the extruder head is T5.

All glass fibers were added in the devolatilizing opening of the extruder (at a temperature T2).

The processing temperature of polypropylene is 240° C. The softening temperature is 168° C.

The strand coming from the extruder was cooled in a water vessel and cut to granules having a length of 6 mm.

Granules obtained by applying the processes mentioned in table 1 were processed to form plates (65×65 ×3.2 cm³) using an Arburg injection moulding machine. The plates were characterized for impact strength (Izod ISO 180) and modulus of elasticity (ASTM D 790).

TABLE 2

| Ex. | Izod (perpendicular) (kJ/m²) | Izod // (kJ/m²) | E mod (perpendicular) (N/mm²) | E mod // (N/mm²) |
| --- | --- | --- | --- | --- |
| I | 11.6 | 10.5 | 2680 | 2900 |
| II | 11.1 | 10.0 | 2940 | 3432 |
| III | 11.3 | 9.9 | 2424 | 3031 |
| IV | 10.3 | 8.9 | 3340 | 3833 |
| V | 11.0 | 10.1 | 3131 | 3950 |
| VI | 21.4 | 19.7 | 3000 | 3705 |
| VII | 15.7 | 14.4 | 2805 | 3340 |

From table 2 it appears, that using the granulate according to the invention, plates are obtained, which have good mechanical properties. The granulate is produced using a low rotation speed of the screw in the extruder, resulting in a low shear stress. It is found that, if the mixing takes place under very mild conditions, the final properties will be more than sufficient. Excellent mechanical properties can be obtained when a polymer having a low melt index (Stamylan P, PHC22) is used, see for example experiment VI.

EXAMPLE VIII AND COMPARATIVE EXPERIMENT A

According to example VI, polypropylene was mixed with 40% (wt) (=16% (vol)) glass fiber bundles, the temperatures in the extruder being 50°-100°-190°-220°-210° °C. From the granules obtained an injection moulded plate was made of which the impact strength was measured (Izod ISO 180). The value found was compared with that of an injection moulded plate produced under the same circumstances from Verton® MFX-7008, a 40% (wt) glass-filled polypropylene of the firm of ICI.

These granules were produced by means of pultrusion as described in EP-A-170245 and can be compared with the production technique as described in U.S. Pat. No. 4,169,189 (see table 3). Visually, the granules of example VIII distinguished themselves from the granules of comparative experiment A by the presence of tufts of glass fiber bundles that were randomly three dimensional orientated in the granules.

TABLE 3

| Ex. | Izod (perpendicular) (kJ/m²) | Izod // (kJ/m²) |
| --- | --- | --- |
| VIII | 28.2 | 24.3 |
| A | 27.8 | 19.5 |

From table 3 it can be seen, that the good mechanical properties of the plate according to example VIII were much more uniformly distributed than those of the plate according to comparative experiment A.

Furthermore, the surfaces of the injection moulded plates of example VIII and comparative experiment A showed great differences. The surfaces of plates of example VIII were evenly glossy, unlike the mat surface of the plate of comparative experiment A.

It is a widely recognized problem, that the incorporation of fibers may result in matness (roughness) of the surface of an end product.

EXAMPLE IX AND COMPARATIVE EXPERIMENT B

From granules obtained from example VI, test plates were moulded and analyzed by means of digital picture processing.

At the place where no tufts of glass fibers were present, the pictures showed a much lower light intensity than at a place where tufts of glass fibers did occur. In order to measure the surface fraction occupied by fiber bundles, a threshold value of 150 was set. As a consequence, all surface units of the matrix having a value >150 were counted.

On this basis the surface fraction occupied by fiber bundles ($A_A$) was determined. This surface fraction is the same on average as the volume fraction ($V_v$) sought. The test was carried out five times. The same test was carried out with granules obtained with Verton ® granules (as also was used in comparative experiment A). Of some plates photos have been enclosed. The photos 1 show pictures of a plate according to example IX; the photos 2 show pictures of a plate according to comparative experiment B. The photos A show the pictures without the threshold value having been set; the photos B show the same picture, but this time with a threshold value set at 150.

| Ex. | Corresponding ex. | $A_A$ | degree of dispersion | photo |
| --- | --- | --- | --- | --- |
| IX | VI | 71% | 0.014 | 1 |

-continued

| Ex. | Corresponding ex. | $A_A$ | degree of dispersion | photo |
|---|---|---|---|---|
| B | A | 22% | 0.046 | 2 |

These results show, how the degree of dispersion of the various plates was measured. From the photos 1 and 2 the difference between the products is evident.

EXAMPLES X AND XI

In a Schwabenthan single-screw extruder (45 mm, 30 D), compositions were extruded of acrylonitrile-butadiene-styrene copolymer (ABS, type TZ220 provided by DSM) together with glass fiber bundles (Silenka 8045, 4.5 mm long). The following temperatures and speeds were set (table 4).

TABLE 4

| Ex. | TZ220 (kg/h) | Silenka 8045 (kg/h) | Temperature T1 T2 T3 T4 T5 (°C.) | Speed (rpm) |
|---|---|---|---|---|
| X | 11.16 | 2.79 | 60-180-210-220-230 | 75 |
| XI | 11.16 | 2.79 | 60-130-200-230-230 | 75 |

The temperatures mentioned in table 4 refer to several zones in the extruder. T1 is the inlet temperature, T2 the temperature just before the devolatilizing opening. After this opening there are two temperature zones, having temperatures T3 and T4; the temperature at the extruder head is T5. All glass fibers were added in the devolatilizing opening of the extruder (at a temperature T2).

The strand coming from the extruder was cooled in a water vessel and cut to granules having a length of 6 mm.

Granules obtained by applying the processes mentioned in table 1 were processed to form plates (65×65×3.2 cm$^3$) using an Arburg injection moulding machine. The plates were characterized for impact strength (Izod ISO 180) and modulus of elasticity (ASTM D 790).

TABLE 5

| Ex. | Izod (perpendicular) (kJ/m$^2$) | Izod // (kJ/m$^2$) | E mod (perpendicular) (N/mm$^2$) | E mod // (N/mm$^2$) |
|---|---|---|---|---|
| X | 14.0 | 12.8 | 3333 | 3612 |
| XI | 13.5 | 12.5 | 3412 | 3818 |

EXAMPLE XII

In a Schwabenthan single-screw extruder (45 mm, 30 D), a composition was extruded of polycarbonate (PC, type Xantar 19 provided by DSM) together with glass fiber bundles (Silenka 8045, 4.5 mm long). The following temperatures and speeds were set (table 6).

TABLE 6

| Ex. | PC X19 (kg/h) | Silenka 8045 (kg/h) | Temperature T1 T2 T3 T4 T5 (°C.) | Speed (rpm) |
|---|---|---|---|---|
| XII | 8.0 | 2.0 | 220-260-280-280-280 | 100 |

The temperatures mentioned in table 6 refer to several zones in the extruder. T1 is the inlet temperature, T2 the temperature just before the devolatilizing opening. After this opening there are two temperature zones, having temperatures T3 and T4; the temperature at the extruder head is T5. All glass fibers were added in the devolatilizing opening of the extruder (at a temperature T2).

The strand coming from the extruder was cooled in a water vessel and cut to granules having a length of 6 mm.

Granules obtained by applying the process mentioned in table 6 were processed to form plates (65×65×3.2 cm$^3$) using an Arburg injection moulding machine. The plates were characterized for impact strength (Izod ISO 180) and modulus of elasticity (ASTM D 790).

TABLE 7

| Ex. | Izod (perpendicular) (kJ/m$^2$) | Izod // (kJ/m$^2$) | E mod (perpendicular) (N/mm$^2$) | E mod // (N/mm$^2$) |
|---|---|---|---|---|
| XII | 7.2 | 6.8 | 3745 | 4550 |

The experiments illustrate, that using the granulate according to the invention, moulding compounds are obtained, which have good mechanical properties. When the granulate according to the invention is used, the mechanical properties are much more uniformly distributed than those of the moulding compounds, which are obtained by the comparative experiment.

Furthermore, the experiments show, that using the granulate according to the invention results in obtaining a glossy surface of the moulding compounds, unlike the mat surface of the moulding compound of comparative experiment A.

We claim:

1. A granulated thermoplastic polymer composition comprising granules incorporating 0.1–50% by volume fiber bundles, the fiber bundles having a three dimensional orientation in each of the granules, and each fiber bundle contains at least 100 fibers and the granules have a degree of dispersion of 0.01–0.10, the degree of dispersion being the reciprocal value of the average volume fraction occupied by the fiber bundles and average volume fraction expressed as a percentage of a granule, measured via the threshold value method.

2. A granulated thermoplastic polymer composition according to claim 1, wherein the degree of dispersion is 0.01–0.04.

3. A granulated thermoplastic polymer composition according to claim 2, wherein the degree of dispersion is 0.01–0.02.

4. A granulated thermoplastic polymer composition according to claim 1, wherein the fiber bundles comprise glass fiber bundles having a length of 2–15 mm.

5. A granulated thermoplastic polymer composition according to claim 4, wherein the fiber bundles contain 100 to 25000 glass fibers.

6. Moulding compound formed from the granulated thermoplastic polymer composition according to claim 1.

* * * * *